(12) United States Patent
Wheeler et al.

(10) Patent No.: US 12,299,184 B2
(45) Date of Patent: May 13, 2025

(54) ESTABLISHING A TRUST RELATIONSHIP BETWEEN A PERIPHERAL DEVICE AND A SERVER

(71) Applicant: Logitech Europe S.A., Lausanne (CH)

(72) Inventors: Stephen Wheeler, Ottawa (CA); Laurent Gillet, Grandvaux (CH); Marc Viredaz, Villaraboud (CH); Nabil Hamzi, Lausanne (CH); Xavier Caine, San Jose, CA (US)

(73) Assignee: Logitech Europe S.A., Lausanne (CH)

( * ) Notice: Subject to any disclaimer, the term of this patent is extended or adjusted under 35 U.S.C. 154(b) by 216 days.

(21) Appl. No.: 18/088,276

(22) Filed: Dec. 23, 2022

(65) Prior Publication Data

US 2024/0214373 A1    Jun. 27, 2024

(51) Int. Cl.
| | |
|---|---|
| *G06F 21/83* | (2013.01) |
| *G06F 21/44* | (2013.01) |
| *H04L 9/00* | (2022.01) |
| *H04L 9/32* | (2006.01) |
| *H04L 9/40* | (2022.01) |

(52) U.S. Cl.
CPC .............. *G06F 21/83* (2013.01); *G06F 21/44* (2013.01); *H04L 9/006* (2013.01); *H04L 9/3247* (2013.01); *H04L 63/08* (2013.01); *H04L 63/083* (2013.01)

(58) Field of Classification Search
CPC ......... G06F 21/44; G06F 21/83; H04L 9/006; H04L 63/08
See application file for complete search history.

(56) References Cited

U.S. PATENT DOCUMENTS

| | | | | |
|---|---|---|---|---|
| 2011/0246756 | A1* | 10/2011 | Smith | H04L 9/32 713/170 |
| 2016/0204946 | A1* | 7/2016 | Carpenter | H04L 9/14 713/168 |
| 2017/0364713 | A1* | 12/2017 | Speak | G06F 21/53 |

OTHER PUBLICATIONS

Wyro ("Encrypting vs. Signing with OpenPGP. What's the Difference"—Mdaemon) (Year: 2020).*

\* cited by examiner

*Primary Examiner* — Boris D Grijalva Lobos
(74) *Attorney, Agent, or Firm* — Kilpatrick Townsend & Stockton LLP

(57) ABSTRACT

A method of authorizing a computer mouse to perform a particular action may include receiving, by a network device, a request associated with a particular action to be performed by a computer mouse. The request may be digitally signed using a private device key of the computer mouse. The method may include validating, by the network device, the digitally signed request using a public device key previously provided by the computer mouse. The method may include generating a response to the request. The response may indicate whether the computer mouse is authorized to perform the particular action associated with the trusted request. The method may include sending the response to a client device associated with the computer mouse.

18 Claims, 14 Drawing Sheets

ESTABLISHING A TRUST RELATIONSHIP BETWEEN A PERIPHERAL DEVICE AND A SERVER

BACKGROUND OF THE INVENTION

Peripheral devices (such as a computer mice, keyboards, microphones, etc.) may be used to provide various inputs to an associated client device (such as a personal computer). In some instances, the functions performed by such peripheral devices (such as authentication measures, activating advanced features, etc.) may warrant additional security to ensure that the actions to be performed by the peripheral device are being initiated by a trusted and/or otherwise authorized user. However, as there is no direct communications path between the peripheral device and a backend authorization device (such as a server or other network device), communications between the peripheral device and a server must rely on the peripheral device's client device (such as a personal computer). However, the authorization device may not have a trust relationship with the client device and/or the client device may include malware or other software that may compromise the security of the communications. Therefore, improvements in establishing trust relationships between peripheral devices and backend authorization devices are desired.

BRIEF SUMMARY OF THE INVENTION

Some embodiments of the present technology may include methods of authorizing a computer mouse to perform a particular action. The methods may include receiving, by a network device, a request associated with a particular action to be performed by a computer mouse. The request may be digitally signed using a private device key of the computer mouse. The methods may include validating, by the network device, the digitally signed request using a public device key previously provided by the computer mouse. The methods may include generating a response to the request, the response indicating whether the computer mouse is authorized to perform the particular action associated with the request. The methods may include sending the response to a client device associated with the computer mouse.

In some embodiments, the methods may include prior to receiving the request, receiving, by the network device, the public device key and an identity token from the client device. The public device key may be generated by the computer mouse associated with the client device. The methods may include associating, by the network device, the public device key with a particular user. The methods may include sending, by the network device, a server public key to the client device. The particular action may include an action selected from the group consisting of logging into a software application, unlocking a software-locked feature of the computer mouse, and performing the software-locked feature of the computer mouse. The request may be received from a remote device. The request may be received from the client device. The public device key received from the computer mouse may be encrypted using a public key of the network device. The methods may include decrypting, by the network device, the public device key using a private key of the network device. The request may be encrypted using a public key of the network device. The methods may include decrypting, by the network device, the request using a private key of the network device.

Some embodiments of the present technology may encompass methods of securely receiving data from a computer mouse. The methods may include receiving, by a network device, a data package from a computer mouse. The data package may have been digitally signed using a private key of the computer mouse. The data package may have been encrypted by the computer mouse using a public key of the network device. The methods may include validating, by the network device, a digital signature of the data package using a public key of the computer mouse. The methods may include decrypting, by the network device, the data packing using a private key of the network device. The methods may include accessing, by the network device, data from the data package.

In some embodiments, the methods may include storing and analyzing the data from the data package. The methods may include prior to receiving the data package, receiving, by the network device, the public device key and an identity token from a client device associated with the computer mouse. The public device key may be generated by the computer mouse associated with the client device. The methods may include associating, by the network device, the public device key with a particular user. The methods may include sending, by the network device, a server public key to the client device. The methods may include sending, by the network device, a command to the computer mouse that causes the computer mouse to generate the data package. The data from the data package may include one or more types of data selected from the group consisting of proprietary data, diagnostic data, sensitive data, and analytical data. The data package may be relayed from the computer mouse to the network device using a client device associated with the computer mouse. The client device may include a device selected from the group consisting of a personal computer, a tablet computer, an e-reader, and a mobile phone.

Some embodiments of the present technology may encompass methods of performing a particular action using a computer mouse. The methods may include generating, by a computer mouse, a trusted request to perform a particular function. The methods may include digitally signing, by the computer mouse, the trusted request using a private device key of the computer mouse. The methods may include sending, by the computer mouse, the digitally signed trusted request to a client device for subsequent transmission to a network device. The methods may include receiving a response to the digitally signed trusted request from the client device. The response may originate from the network device. The methods may include performing the particular function when the response comprises an approval.

In some embodiments, the methods may include encrypting the signed request using a public server key of the network device. The methods may include prior to generating the trusted request, generating a device key pair comprising the private device key and a public device key. The methods may include sending the public device key to the client device for subsequent transmission to the network device. The response may be digitally signed by the network device using a private server key of the network device. The methods may include validating a signature of the digitally signed response using a public server key of the network device. The response may be encrypted by the network device using a public device key of the computer device. The method may include decrypting the digitally signed response using a private device key of the computer mouse. The particular function may include one or both of unlocking a software or firmware-locked feature of the computer mouse and performing the software or firmware-locked feature of the computer mouse.

BRIEF DESCRIPTION OF THE DRAWINGS

A further understanding of the nature and advantages of the disclosed technology may be realized by reference to the remaining portions of the specification and the drawings.

Figure 1:
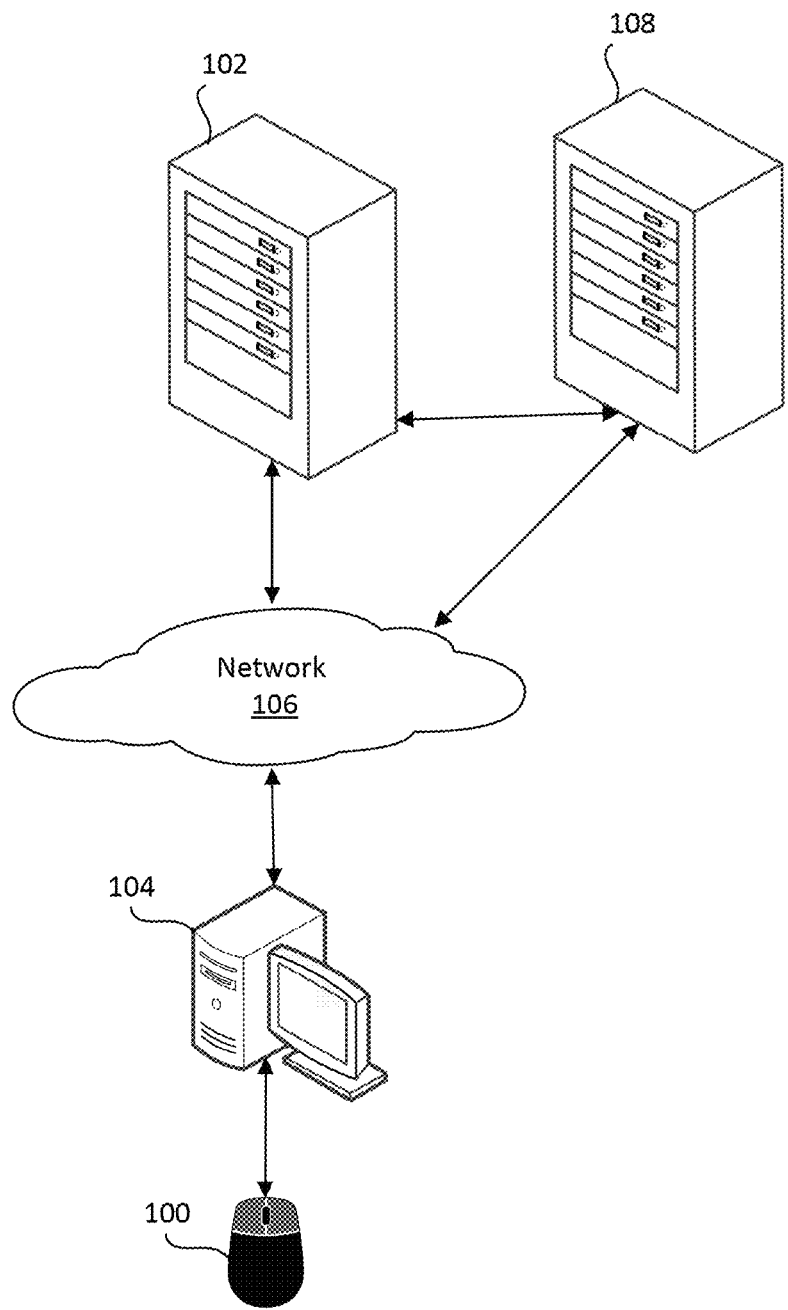
FIG. 1 is a system diagram of a system for establishing a trust relationship between a peripheral device and a network device according to embodiments of the present invention.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to systems and methods for establishing a trust relationship between a peripheral device and a server and/or other network device. The trust relationship may provide a layer of security between the peripheral device and the network device and may provide secure techniques for enabling a software/firmware-locked feature of the peripheral device and/or an associated client device, sending analytic and/or diagnostic data, and/or providing authentication means for other functions. Embodiments may create the trust relationship between the peripheral device and a network device (such as a server) by leveraging a network connection between the network device and a client device with which the peripheral device is connected.

Embodiments may address problems associated with enabling actions on a peripheral device in which higher levels of trust and/or data security are desired. In conventional systems, the lack of a direct connection between a peripheral device and corresponding network device (e.g., a server) makes a communication susceptible to attacks via a client device (e.g., a personal computer) that is connected to the peripheral device and used to communicate with the network device. For example, the user of the client device may not be authorized to perform a particular action using the peripheral device and/or the client device may be susceptible to its own security risk (e.g., phishing, malware, and/or other cyber attack). Embodiments address these issues by enabling secure communications in both directions between the peripheral device and the network device.

Embodiments may provide such benefits by executing a registration step between the peripheral device and the network device. The registration may be performed by a user that is authorized to access a particular network device. For example, the user may use a client device to create an account with a network device and/or separate identity provider. In response, identity tokens are received by the client device. The identity tokens may identify the user as a particular authorized user who has access to the network device and/or separate identity provider. These tokens may be sent to the peripheral device (such as via the client device using a local wired or wireless connection), which may use the tokens to establish a relationship with the network device. For example, the peripheral device may generate a key pair and send one of the keys (and the tokens) to the network device, via the client device. The network device may associate the key with the user's identity (using the tokens) to create the trust relationship in both directions between the peripheral device and the network device. Once the trust relationship is generated via the registration step, trusted requests may be submitted that enable particular trust or high security actions to be performed using the peripheral device.

Turning now to FIG. 1, a system diagram for establishing a trust relationship between a peripheral device 100 and a server and/or other network device 102 is illustrated. Peripheral devices 100 may include keyboards, computer mice, web cameras, microphones, headsets, speakers, biometric input device (e.g., fingerprint readers, palm readers, retinal scanners, etc.), and/or any other device that may be connected to (and used to provide inputs to) a client device 104, but that typically does not include a dedicated Internet connection. Client devices 104 may include personal computers, tablet computers, e-readers, mobile phones, and/or other electronic devices that are connectable to one or more wired or wireless networks 106 (such as the Internet, enterprise networks, etc.). Data transmitted across the networks 106 may be secured using encryption techniques, hypertext transfer protocol secure (HTTPS), secure sockets layer (SSL), transport layer security (TLS), and/or other security protocol. The peripheral device 100 may be coupled with the client device 104 using a wired and/or local wireless connection (such as Bluetooth, a local Wi-Fi connection, and/or other wireless protocol), and any number of peripheral devices 100 may be coupled with a single client device 104.

As noted above, a trust relationship between one of the peripheral devices 100 and a network device 102 (such as, but not limited to, an authorization server) may be established. For example, the peripheral device 100 and the network device 102 may communicate with one another via one or more of the networks 106, using the client device 104 as an intermediary. For example, the peripheral device 100 may direct communications to the network device 102 that is routed through the client device 104 and leverages the client device's network interface to relay the communications to the network device 102. Similarly, the network device 102 may direct communications to the peripheral device that is routed through the client device 104 and leverages the client device's network interface to relay the communications to the peripheral device 100. As will be discussed in greater detail below, a number of communications may be exchanged between the various devices which may serve to establish a trust relationship between the peripheral device 100 and the network device 102. The trust relationship may enable the network device 102 to trust the peripheral device 100 and/or may enable the peripheral device 100 to trust the network device 102. The trust relationship between the peripheral device 100 and the network device 102 may provide an additional layer of security that may enable the peripheral device 100 to be used to securely perform various functions that require additional security, such as (but not limited to) enabling a software/firmware-locked feature of the peripheral device and/or an associated client device, providing authentication means for other functions, securely sending log data and/or sensitive data, and/or other functions.

In some embodiments, the system may include an identity provider 108, such as an enterprise server. For example, a user of the client device 104 and/or the peripheral device 100 may create a user account with the identity provider 108 in order to gain access to controlled portions and/or services of an enterprise website on the Internet or an extranet. In some embodiments, the identity provider 108 may be operated by a separate entity as the network device 102, while in other embodiments, the identity provider 108 and network device 102 may be operated by a single entity. In some embodiments, the network device 102 may be or include an authorization provider, which may provide authentication and/or authorization for the peripheral device 100 to perform one or more actions that require a trust relationship between the peripheral device 100 and the network device 102.

Figure 2:
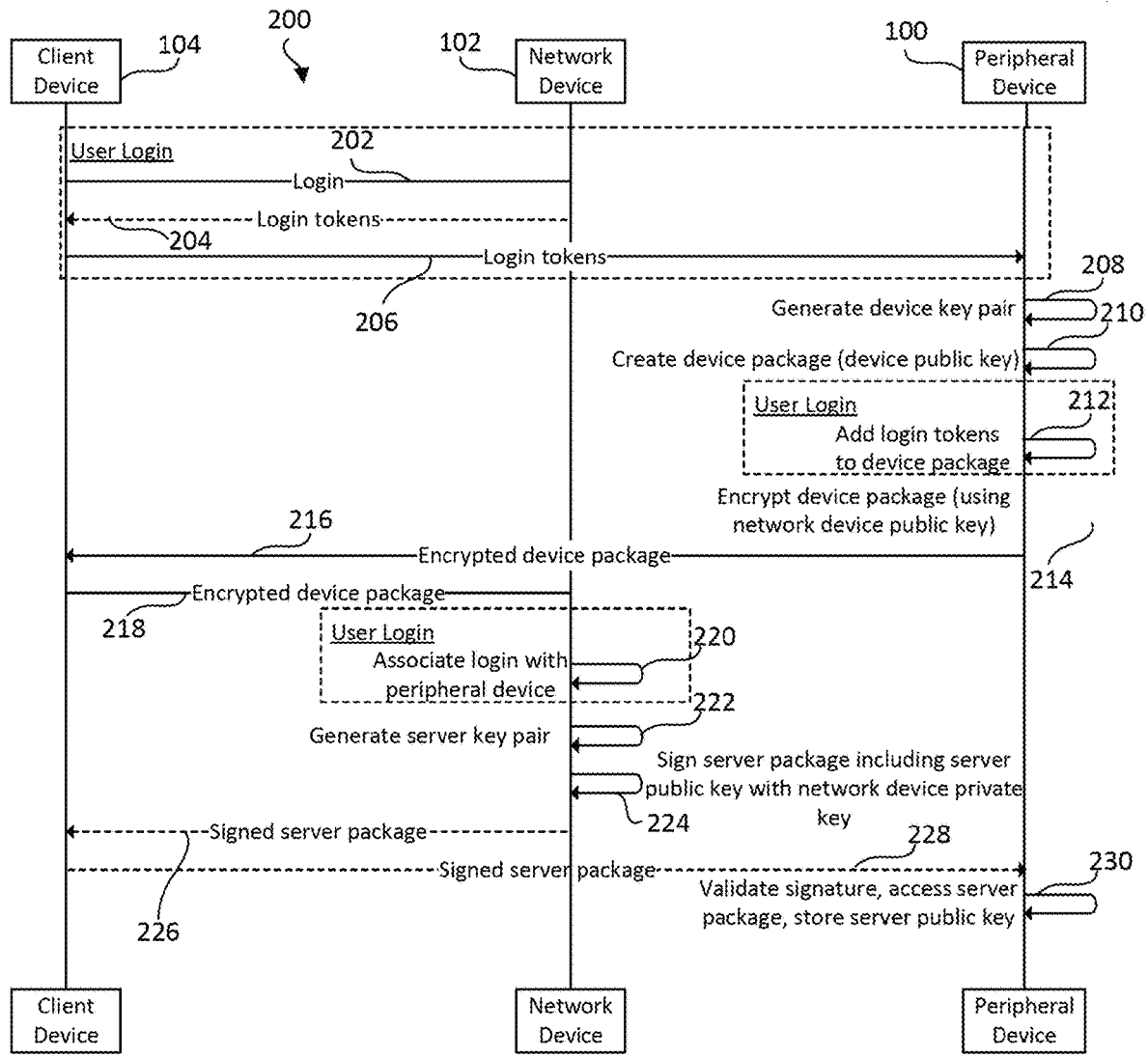
FIG. 2 is a swimlane diagram illustrating a process for establishing a trust relationship between a peripheral device and a network device according to embodiments of the present invention.

FIG. 2 illustrates a swimlane diagram of a process 200 for provisioning or establishing a trust relationship between a peripheral device 100 and a network device 102 (which may be an authorization provider in some embodiments). In particular, process 200 may be used to enable the network device 102 to trust the peripheral device 100. This form of trust may be particularly useful for enabling a software/firmware-locked feature of the peripheral device and/or an associated client device, providing authentication means for other functions, although may be used to perform numerous other functions that require greater security and trust between a peripheral device 100 and a network device 102. In some embodiments, the process 200 may include user-authentication steps. For example, a user of the client device 104 may login to a user account with network device 102. At operation 202, the user may provide login credentials, such as a username, password, PIN number, biometric credential, and/or other authorization credential to the network device 102. For example, the credentials may be input by the user into the client device 104 using the peripheral device 100 and/or other input device of the client device 104, with the client device 104 transmitting the login credentials to the network device 102. The network device 102 may validate the login credentials and upon successful validation may send one or more identity tokens to the client device 104 at operation 204. The identity tokens may indicate that the user of the client device 102 has an identity associated with a user account with the network device 102. The identity tokens may be communicated by the client device 104 to the peripheral device 100 at operation 206. In some embodiments, the user account may be associated with an identity provider 108 rather than or in addition to the network device 102. In such embodiments, the identity provider 108 and network device may be operated by the same entity. In such embodiments, the identity token may be validated within the entity's system. If the identity provider 108 and network device are operated by different entities, the network device 102 may send a call to the identity provider 108 that includes the identity token for validation and/or the network device 102 may validate a digital signature of the identity provider 108 that may be included with the identity token. In a particular embodiment, the account creation and user authentication may implement multi-factor authentication, passwordless authentication, and/or other authentication techniques.

After creating and/or logging into the user account, the process 200 may include provisioning the peripheral device 100 to an authorization provider or other network device 102. In some embodiments, the process 200 may be performed well after account creation (e.g., using a pre-established account that the user has signed into), and may begin with the provisioning process. Provisioning the peripheral device 100 may be performed in different ways. For example, the peripheral device 100 may generate a device key pair that may be used to sign and/or encrypt subsequent transmissions at operation 208. For example, the device key pair may include a device public key and a device private key. The device private key may be maintained only on the peripheral device 100 at all times, while the device public key may be provided to the network device 102. For example, the peripheral device 100 may create a device package that includes the device public key at operation 210. In embodiments in which the user logged into the network device 102, the identity tokens may be added to the device package at operation 212. At operation 214, the device package may be encrypted, such as by using a network device public key. The network device public key may be embedded within firmware of the peripheral device 100. For example, the manufacturer (which may operate network device 102) of the peripheral device 100 may embed the network device public key in the firmware of the peripheral device 100 during manufacture of the peripheral device and/or as part of a firmware update that is pushed to the peripheral device 100.

The encrypted device package may be sent to the client device 104 at operation 216. The client device 104 may then send the encrypted device package to the network device 102 at operation 218. In such embodiments, the network device 102 may decrypt the encrypted device package (e.g., using a network device private key associated with the network device public key).

Once the network device 102 has access to the identity tokens and/or device public key, the network device 102 may associate the device public key with the user of the client device 104 and the identity tokens at operation 220, such as using the identity indicated by the identity tokens. The network device 102 may be able to validate the identity tokens provided by the peripheral device 100. The network device 102 may generate a server key pair at operation 222. For example, the server key pair may include a server public key and a server private key that are unique to the particular peripheral device 100. The server private key may be maintained only on the network device 102 at all times, while the server public key may be provided to the peripheral device 100. For example, a server package may be assembled that includes the server public key. In some embodiments, the server package may be encrypted, such as by using the device public key. The server package may be digitally signed at operation 224 using a network device private key that corresponds to the network device public key that is embedded in the firmware of the peripheral device 100. The signed server package may be sent to the client device 104 at operation 226. The client device 104 may send the signed server package to the peripheral device 100 at operation 228. The peripheral device 100 may validate the digital signature using the network device public key, decrypt (if necessary) the server package using the device private key, and/or store the server public key at operation 230. At this point, a trust relationship between the peripheral device 100 and the network device 102 has been established. Upon provisioning the peripheral device 100 (e.g., establishing a trust relationship between the peripheral device 100 and the network device 102) a number of functions may be performed that rely on the trust relationship as will be discussed in greater detail below.

Figure 3:
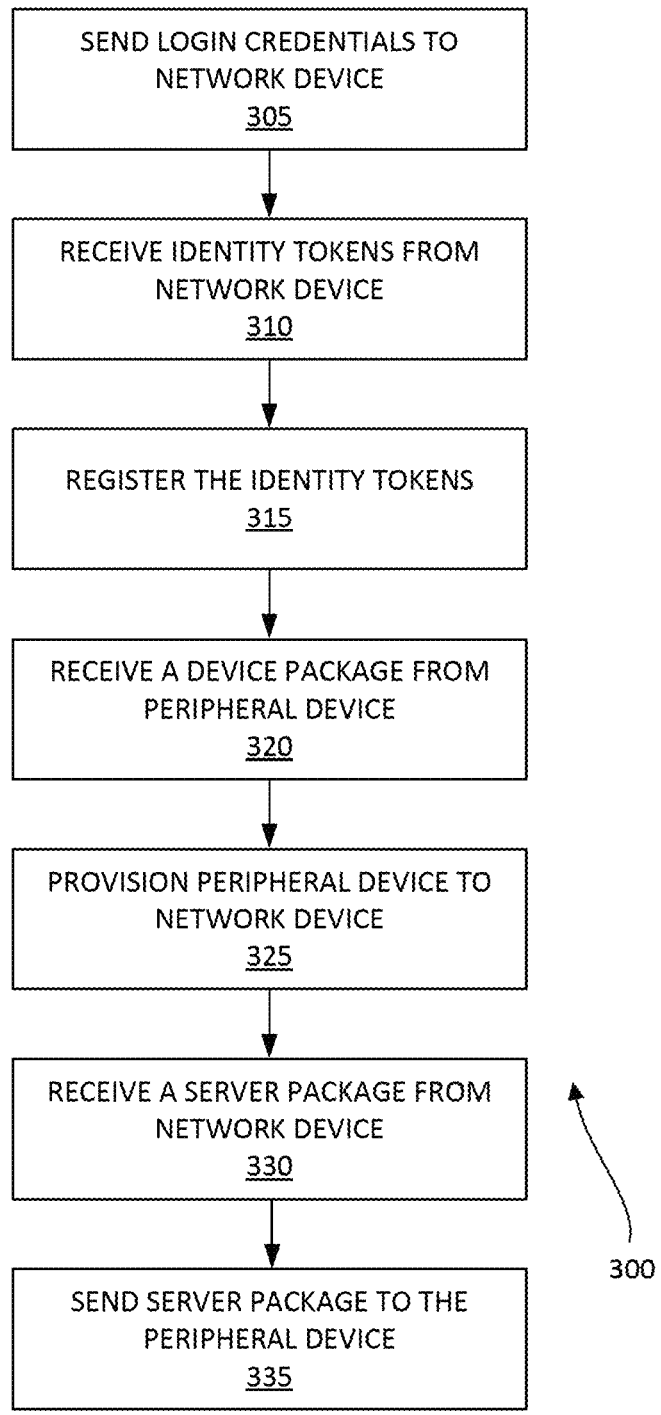
FIG. 3 is a flowchart of a process for establishing a trust relationship between a peripheral device and a network device using a client device according to embodiments of the present invention.

FIG. 3 is a flowchart of a process 300 for establishing a trust relationship between a peripheral device 100 and a network device 102. Process 300 may describe further details of processes 200, 400, and 500 described herein. Process 300 may be performed, for example, by a client device 104 that serves as a communication intermediary between the peripheral device 100 and the network device 102. Process 300 may be performed after a user account has been created and/or logged into by a user of the client device 104, and in some embodiments may begin with or otherwise include the account creation and/or login process. For example, the user may provide one or more personal details and/or other login credentials (e.g., username, password, PIN, biometric, credentials, and/or other credentials) to the network device 102 and/or a separate identity provider 108 to log into the account at operation 305. Upon successful login, the client device 104 may receive one or more identity tokens from the network device 102 and/or a separate identity provider 108 at operation 310. At operation 315, the client device 104 may register the identity tokens by sending each identity token received during the account creation process to a peripheral device 100 that is connected (e.g., physically and/or wirelessly) to the client device 104.

After the identity tokens have been registered with the peripheral device 100 (either as part of process 300 or at a prior time), the client device 104 may receive a device package from the peripheral device 100 at operation 320. The device package may include a device public key, and may be encrypted using a network device public key of the network device 102, which may have been provided within firmware of the peripheral device 100. This may enable the device package to be unreadable to the client device 104 and/or any other intervening party. The client device 104 may then provision the peripheral device 100 to the network device 102 at operation 325. Provisioning the peripheral device 100 may include sending the device package and each identity token to the network device 102. At operation 330, the client device 104 may receive a server package from the network device 102. The server package may include the server public key. In some embodiments, the server package may be encrypted, such as by using the device public key and/or may be digitally signed using a network device private key that corresponds to the network device public key that is embedded in the firmware of the peripheral device 100. The client device 104 may send the signed and/or encrypted server package to the peripheral device 100 at operation 335. Once the peripheral device is able to access the server key, the peripheral device 100 may have a trust relationship with the network device 102.

Figure 4:
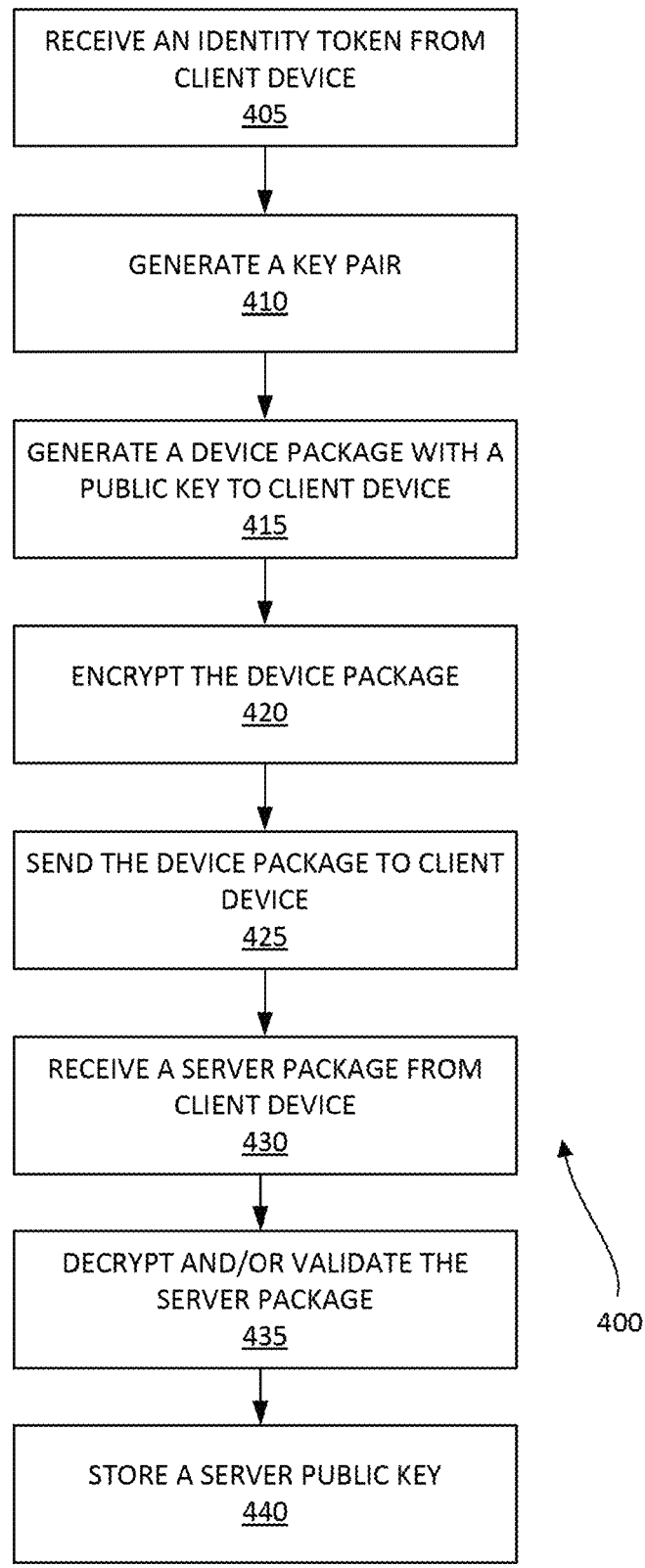
FIG. 4 is a flowchart of a process for establishing a trust relationship between a peripheral device and a network device using the peripheral device according to embodiments of the present invention.

FIG. 4 is a flowchart of a process 400 for establishing a trust relationship between a peripheral device 100 and a network device 102. Process 400 may describe further details of processes 200, 300, and 500 described herein. Process 400 may be performed, for example, by a peripheral device 100 that uses a connected client device 104 as a communication intermediary to exchange communications between the peripheral device 100 and the network device 102. Process 400 may include a user account creation and/or login process by a user of the client device 104. For example, the user may provide one or more personal details and/or other login credentials to the network device 102 and/or a separate identity provider 108 to create and/or log into the account. Once the account is created and/or logged into, the client device 104 may receive one or more identity tokens from the network device 102 and/or a separate identity provider 108. The peripheral device 100 may receive an identity token from the client device 104 at operation 405.

At operation 410, the peripheral device 100 may generate a device key pair, such as a device public key and a device private key. The peripheral device 100 may create a device package that includes the device public key and/or the identity tokens at operation 415. The peripheral device 100 may encrypt the device package, such as by using a network device public key that is embedded within firmware of the peripheral device 100 at operation 420. The device package may be sent to the client device 104 at operation 425, and the client device 104 may then provision the peripheral device 100 to the network device 102 by sending the device package to the network device 102. The network device 102 may decrypt the device package and subsequently associate the device public key with the user identity associated with the identity token. The peripheral device 100 may receive a server package from the network device 102 via the client device 104 at operation 430. The server package may include a server public key and may be encrypted using the device public key and/or digitally signed using a network device private key that corresponds to the network device public key that is embedded in the firmware of the peripheral device 100. At operation 435, the peripheral device 100 may decrypt and/or validate the signature of the server package to access the server public key. The peripheral device 100 may store the server public key at operation 440. At this time, the peripheral device 100 may have a trust relationship with the network device 102.

Figure 5:
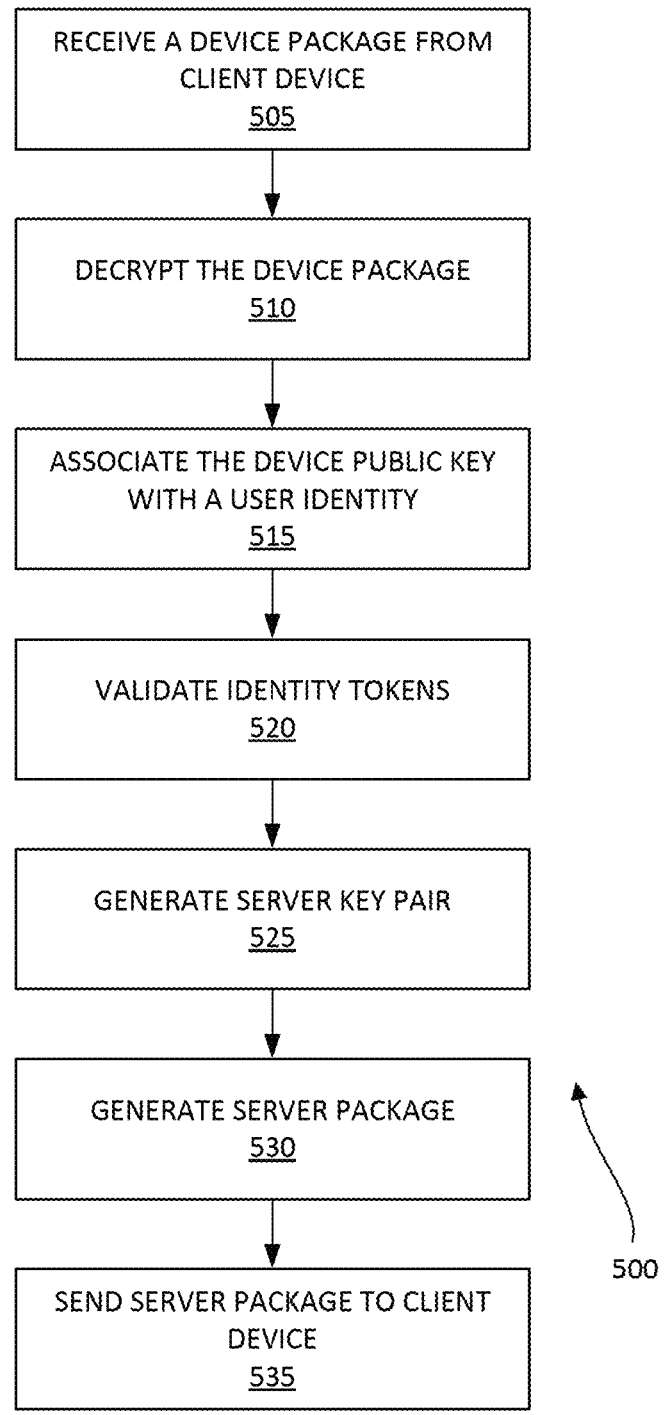
FIG. 5 is a flowchart of a process for establishing a trust relationship between a peripheral device and a network device using the network device according to embodiments of the present invention.

FIG. 5 is a flowchart of a process 500 for establishing a trust relationship between a peripheral device 100 and a network device 102. Process 500 may describe further details of processes 200, 300, and 400 described herein. Process 500 may be performed, for example, by a network device 102 that communicates with the peripheral device 100. For example, a client device 104 that is directly connected to the peripheral device 100 may be used as a communication intermediary to exchange communications between the peripheral device 100 and the network device 102. Process 500 may include a user account creation and/or login process by a user of the client device 104. For example, the user (via the client device 104) may provide one or more personal details and/or other login credentials to the network device 102 and/or a separate identity provider 108 (which may be affiliated with the network device 102) to create the account. Once the account is created and/or logged into (by the network device 102 and/or the separate identity provider 108), the network device 102 and/or the identity provider 108 may send one or more identity tokens to the client device 104.

After an account has been created, a trust relationship between the peripheral device 100 and the network device 102 may be established. At operation 505, the network device 102 may receive a device package that includes a device public key generated by the peripheral device 100 and/or the one or more identity tokens from the client device 104. In some embodiments, the device package may be encrypted prior to being sent to the network device 102 to prevent the client device 104 and/or other intervening devices from reading the server key. For example, the device package may be encrypted using a network device public key that is embedded within firmware of the peripheral device 100. In embodiments in which the device package is encrypted, the network device 102 may decrypt the encrypted device package (e.g., using a network device private key associated with the network device public key) at operation 510 to access the device public key.

Once the device public key and/or identity tokens are received and/or accessed, the network device 102 may associate the device public key with the user identity associated with the identity token at operation 515. The network device 102 may be able to validate the identity tokens provided by the peripheral device 100 at operation 520. If the identity tokens were provided by an identity provider 108 (rather than the network device 102), validating the identity tokens may involve invoking the identity provider 108 and/or via another mechanism (such as validating a digital signature provided with the identity tokens). For example, if the identity provider 108 and network device are operated by the same entity, the identity token may be validated within the entity's system. If the identity provider 108 and network device are operated by different entities, the network device 102 may send a call to the identity provider 108 that includes the identity token for validation and/or the network device 102 may validate a digital signature of the identity provider 108 that may be included with the identity token. At operation 525, the network device 102 may generate a server key pair, such as a server public key and a server private key that are unique to the particular peripheral device 100. At operation 530, the network device 102 may generate a server package that includes the server public key. The server package may be encrypted using the network device private key and/or digitally signed using the device public key. The server package may be sent to the client device 104 for subsequent transmission to the peripheral device 100 at operation 535. At this time, the peripheral device 100 may have a trust relationship with the network device 102.

Figure 6:
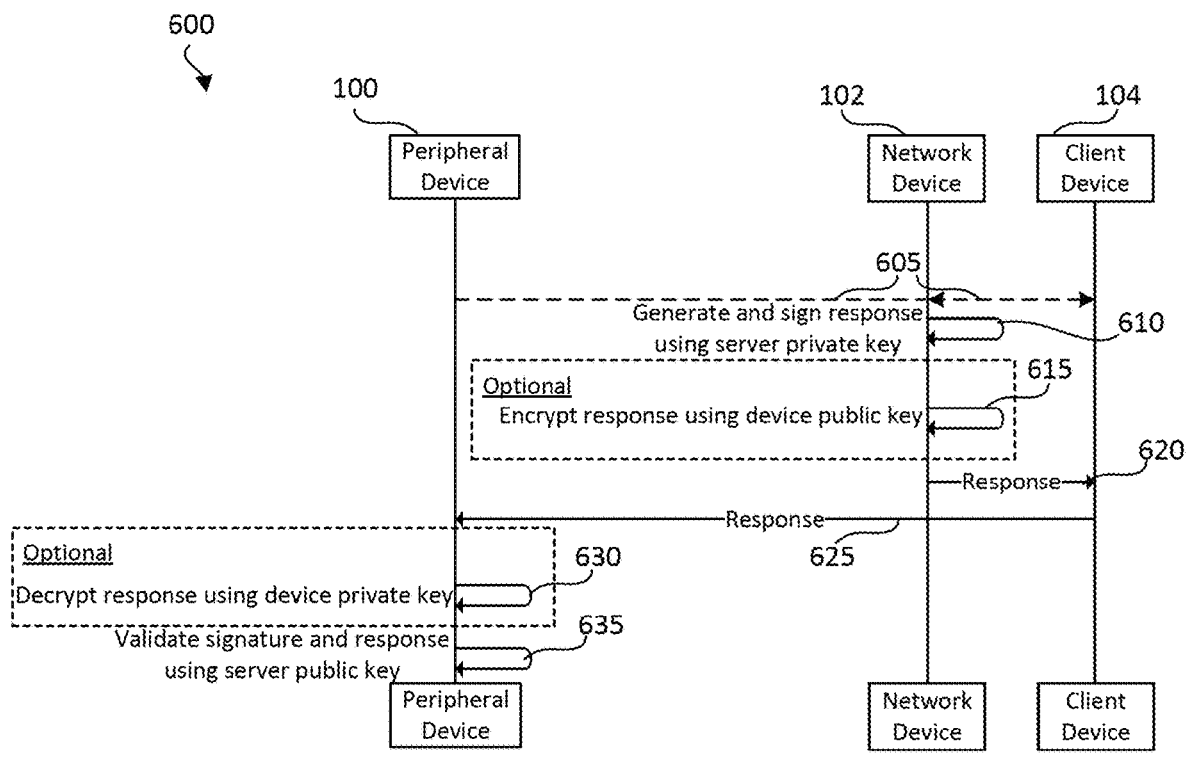
FIG. 6 is a swimlane diagram illustrating a process for making a trusted request according to embodiments of the present invention.

In some embodiments, once the trust relationship has been established, the peripheral device 100 may be used to make a trusted request to the network device 102. For example, the user may wish to use the peripheral device 100 to perform a software/firmware-locked feature of the peripheral device and/or an associated client device and/or provide authentication means for other functions, etc. FIG. 6 illustrates a swimlane diagram of a process 600 for making a trusted request using a peripheral device 100. Process 600 may include and/or follow a provisioning process to establish a trust relationship between the peripheral device 100 and the network device 102, such as the processes described in relation to FIGS. 2-5. At operation 605, a trust request may be initiated. The trusted request may be initiated in various ways. For example, the peripheral device 100 may initiate the trusted request, such as to unlock a premium and/or firmware-locked feature of the peripheral device 100. In such embodiments, the peripheral device 100 may generate and sign a trusted request and send the trusted request to the network device 102 via the client device 104. The request may be signed, for example, using the device private key generated during provisioning of the peripheral device 100. In some embodiments, the trusted request may require validation that the network device 102 that will ultimately receive and validate the request is a particular network device 102. For example, where the request is associated with unlocking a premium feature of the peripheral device 100, the peripheral device 100 may need verification that the network device 102 being invoked is a network device 102 associated with a manufacturer of the peripheral device 100 or other entity that is authorized to grant access or otherwise enable the premium feature. In such instances, the request may alternatively or additionally encrypted, for example, with the server public key received during provisioning of the peripheral device 100. In another embodiment, the trusted request may be initiated by the client device 104. For example, the client device 104 may request that the peripheral device 100 sign and/or encrypt the trusted request, which may then be sent to the network device 102 via the client device 104. In other embodiments, the trusted request may be initiated by any other device that is authorized by the network device 102 for a given user identity. As just one example, an external device (e.g., a smart tv, tablet computer, e-reader, smart speaker, etc.) may be registered for use by a user with the network device 102. For example, a user account of the external device and a user account of the network device 102 may be linked, such as by the user logging into one or both user accounts and authorizing the accounts to be linked. During the linking process, the external device may be provided and/or otherwise access an identifier of the peripheral device 100, which may enable the external device to reference the particular peripheral device 100 in communications with the network device 102. Once authorized, the external device may initiate the trusted request by generating and sending the trusted request to the network device 102. For example, the external device may be a smart speaker and a user may make a verbal command for the external device to unlock a particular feature of the peripheral device 100. The external device may generate a trusted request that includes the identifier of the peripheral device 100 and may send the request to the network device 102 which may process the request based on identifier.

If the trusted request has been signed and/or encrypted, the network device 102 may validate the signature and/or decrypt the trusted request. For example, the network device 102 may utilize the device public key to validate the signature and/or may utilize the server private key to decrypt the trusted request. Once the trusted request is accessible, the network device 102 may process the request and send a response (e.g., an authorization, such as an unlock feature message, or denial of the activity associated with the request) to the request back to the client device 104 at operation 610. The response may be signed by the network device 102, such as using server private key. In some embodiments, the response may be encrypted at operation 615. For example, the network device 102 may use the device public key to encrypt the response. The signed and/or encrypted response may be sent to the client device at operation 620. The client device 104 may relay the response to the peripheral device 100 at operation 625. If the response is encrypted, the peripheral device 100 may decrypt the response at operation 630, such as by using the device private key. At operation 635, the peripheral device 100 may validate the digital signature of the response, such as by using the server public key. Upon accessing the response, the peripheral device 100 may perform an action based on the response. For example, If the response is a denial, the activity associated with the request may be halted, prevented, and/or otherwise stopped from being performed (e.g., the trust action will not occur). If the response is an approval, the peripheral device 100 may complete the requested action. For example, the peripheral device 100 may enable and/or perform a software/firmware-locked feature of the peripheral device 100 and/or an associated client device 104 and/or perform another function associated with the trusted request.

Figure 7:
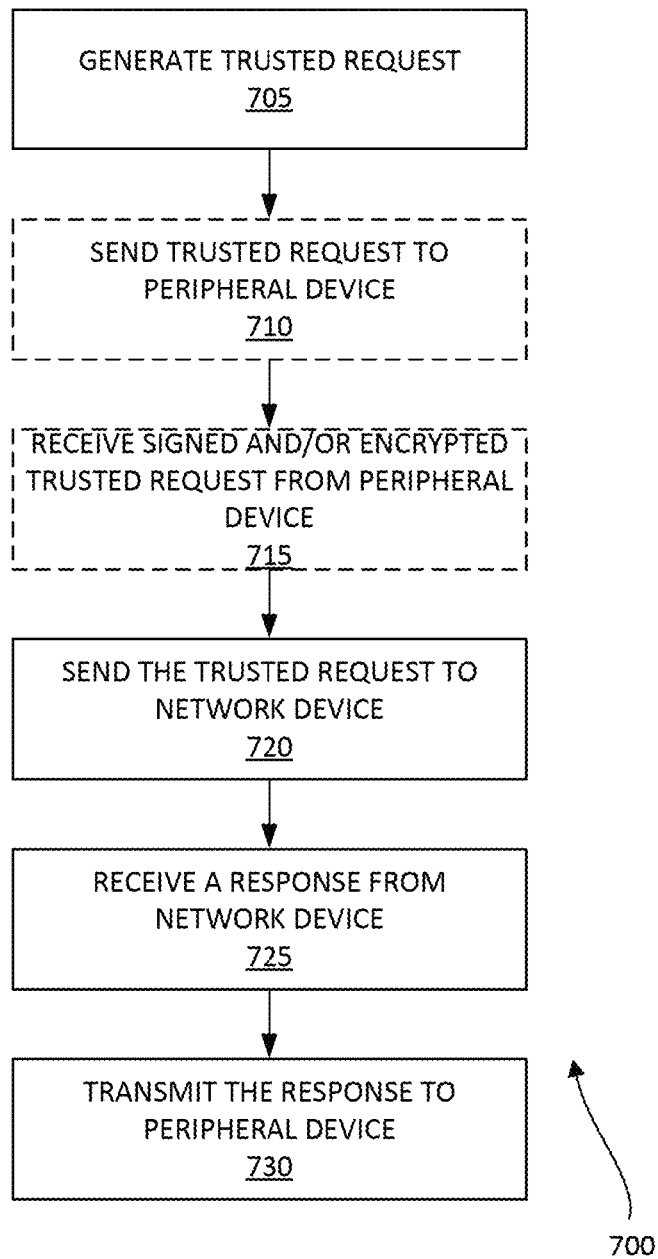
FIG. 7 is a flowchart of a process for making a trusted request using a client device according to embodiments of the present invention.

FIG. 7 is a flowchart of a process 700 for making a trusted request. Process 700 may describe further details of processes 600, 800, and 900 described herein. Process 700 may be performed, for example, by a client device 104 that serves as a communication intermediary between the peripheral device 100 and the network device 102. Process 700 may include and/or be performed after a trust relationship has been established between the peripheral device 100 and the network device 102, such as via a process such as described in relation to FIGS. 2-5. Once the trust relationship has been established, a trusted request may be initiated. In some embodiments, the trusted request may be initiated by the client device 104. For example, the client device 104 may generate a request at operation 705. At operation 710, the client device 104 may send the request to the peripheral device 100 to digitally sign (e.g., using the device private key) and/or encrypt (e.g., using the server public key). The client device 104 may receive the signed and/or encrypted request at operation 715 and may send the request to the network device 102 at operation 720. Operations 710 and/or 715 may be optional, particularly if the peripheral device 100 has already been provisioned. Once the network device 102 has processed the trusted request, client device 104 may receive a response to the trusted request from the network device 102 at operation 725. The response may be signed (e.g., using the server private key) and/or encrypted (e.g., using the device public key) by the network device 102 prior to being sent to the client device 104, which may ensure that the source of the response may be confirmed and/or that an intercepting party may not access the response. The client device 104 may transmit the response to the peripheral device 100 at operation 730. If the response is a denial, the peripheral device 100 may be prevented from performing the requested action. If the response is an approval, the peripheral device 100 may perform the requested action. For example, the peripheral device 100 may enable and/or perform a software/firmware-locked feature of the peripheral device 100 and/or an associated client device 104 and/or perform another function associated with the trusted request.

Figure 8:
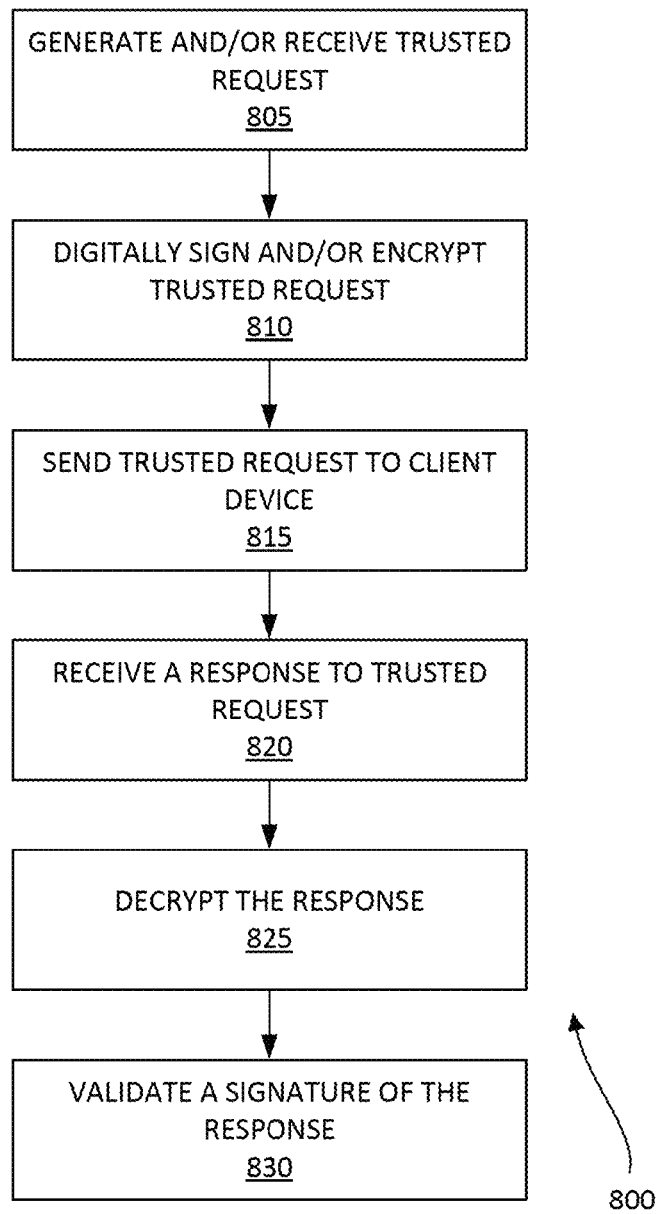
FIG. 8 is a flowchart of a process for making a trusted request using a peripheral device according to embodiments of the present invention.

FIG. 8 is a flowchart of a process 800 for making a trusted request. Process 800 may describe further details of processes 600, 700, and 900 described herein. Process 800 may be performed, for example, by a peripheral device 100 that uses a client device 104 as a communication intermediary with the network device 102. Process 800 may include and/or be performed after a trust relationship has been established between the peripheral device 100 and the network device 102, such as via a process such as described in relation to FIGS. 2-5. Once the trust relationship has been established, a trusted request may be initiated. In some embodiments, the trusted request may be initiated by the client device 104 and/or the peripheral device 100. For example, the peripheral device 100 may generate a trusted request and/or may receive a trusted request from the client device 104 at operation 805. The peripheral device 100 may digitally sign and/or encrypt the trusted request at operation 810. For example, the peripheral device 100 may sign the trusted request using the device private key and/or may encrypt the trusted request using the server public key. At operation 815, the signed and/or encrypted request may be sent to the client device 104 for subsequent transmission to the network device 102. The network device 102 may validate and/or otherwise process the trusted request and communicate a response to the client device 104 for transmission to the peripheral device 100, which may receive the response at operation 820. The network device 102 may sign (e.g., using the server private key) and/or encrypt (e.g., using the device public key) the response prior to sending the response to the client device 104. If the response is encrypted, the peripheral device 100 may decrypt the response at operation 825, such as by using the device private key. At operation 830, the peripheral device 100 may validate the signature of the response, such as by using the server public key. If the response is a denial, the peripheral device 100 may be prevented from performing the requested action. If the response is an approval, the peripheral device 100 may perform the requested action. For example, the peripheral device 100 may enable and/or perform a software/firmware-locked feature of the peripheral device 100 and/or an associated client device 104 and/or perform another function associated with the trusted request.

Figure 9:
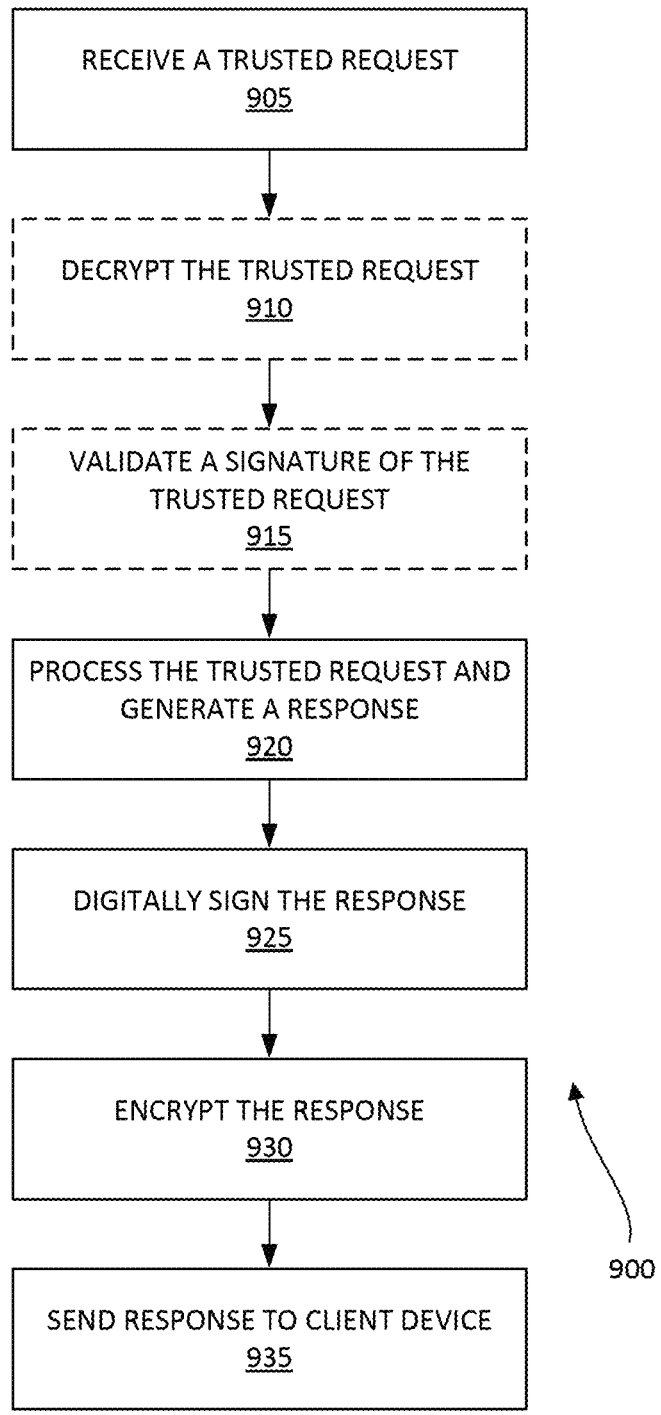
FIG. 9 is a flowchart of a process for making a trusted request using a network device according to embodiments of the present invention.

FIG. 9 is a flowchart of a process 900 for making a trusted request. Process 900 may describe further details of processes 600, 700, and 800 described herein. Process 900 may be performed, for example, by a network device 102 that communicates with a peripheral device 100 via a client device 104 that serves as a communication intermediary between the peripheral device 100 and the network device 102. Process 900 may include and/or be performed after a trust relationship has been established between the peripheral device 100 and the network device 102, such as via a process such as described in relation to FIGS. 2-5. Once the trust relationship has been established, a trusted request may be initiated. The trusted request may be initiated by the client device 104, the peripheral device 100, and/or any other device that is authorized by the network device 102 for a given user identity. The trusted request may be transmitted to the network device 102 via the client device 104 and/or by the other device that is authorized by the network device 102 for a given user identity. Oftentimes, the trusted request may be digitally signed and/or encrypted by the peripheral device 100 prior to being sent to the network device 102. For example, the peripheral device 100 may sign the trusted request using the device private key and/or may encrypt the trusted request using the server public key. The trusted request may be received by the network device 102 at operation 905. If the trusted request is encrypted, the network device 102 may decrypt the request, such as by using the server private key, at operation 910. The signature of the request may be validated, such as by using the device public key, at operation 915. At operation 920, the network device 102 may process the request and may generate a response to the request. The response may indicate whether the peripheral device 100 is authorized to perform the particular action associated with the request. For example, the response may be an authorization, such as an unlock feature message, or denial of the activity associated with the request. The network device 102 may digitally sign the response, such as using the server private key, at operation 925. The network device 102 may optionally encrypt the response, such as using the device public key, at operation 930. The network device 102 may send the signed and/or encrypted response to the request to the client device 104 at operation 935. The client device 104 may relay the response to the peripheral device 100 to enable the peripheral device 100 to perform a particular action associated with the request, or to prevent the action if the response is a denial.

Figure 10:
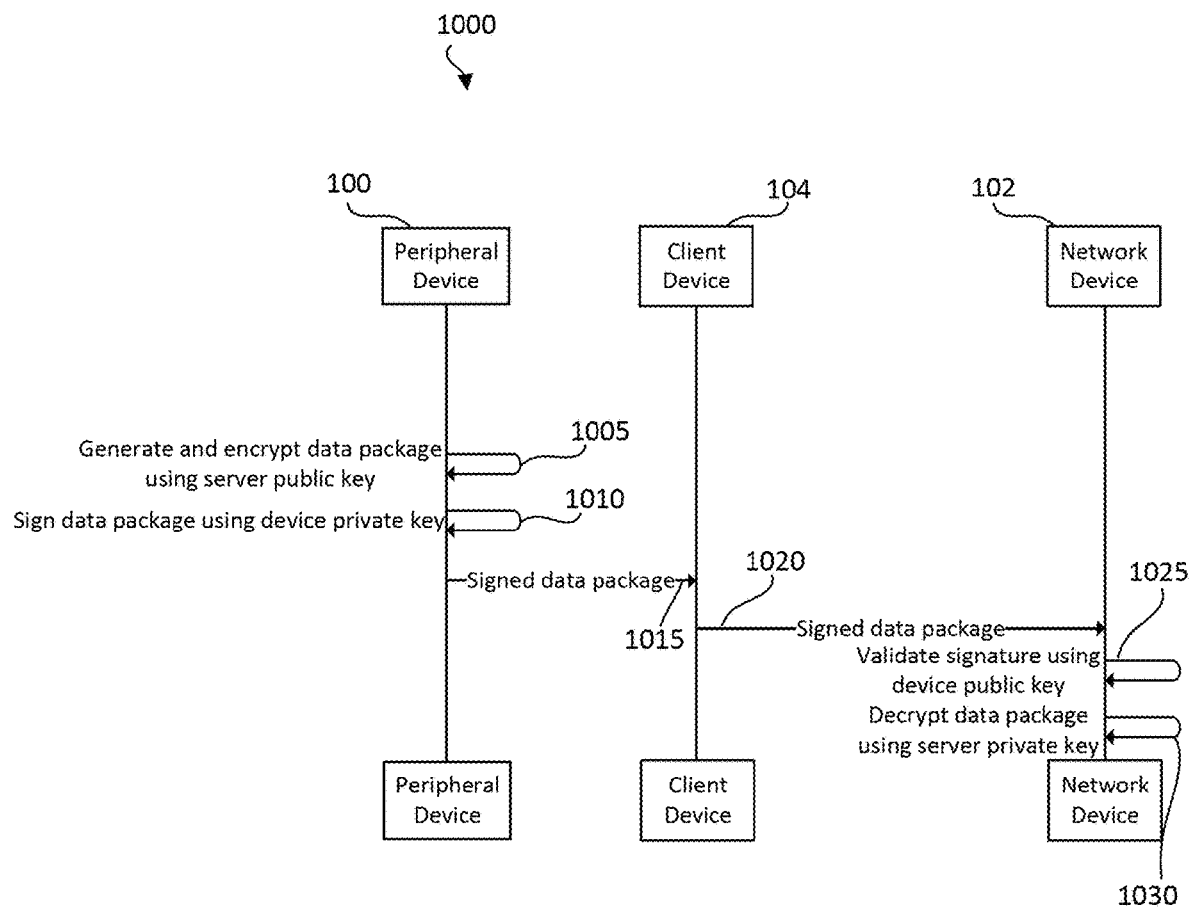
FIG. 10 is a swimlane diagram illustrating a process for securely sending data according to embodiments of the present invention.

In some embodiments, once the trust relationship has been established, the peripheral device 100 may be used to securely send data to the network device 102. For example, the trust relationship may facilitate the sending of proprietary data, diagnostic data, sensitive data, performance data, and/or other data between the peripheral device 100 and the network device 102. FIG. 10 illustrates a swimlane diagram of a process 1000 for securely sending data between a peripheral device 100 and a network device 102. Process 1000 may include and/or follow a provisioning process to establish a trust relationship between the peripheral device 100 and the network device 102, such as the processes described in relation to FIGS. 2-5. At operation 1005, a data package may be created and encrypted by the peripheral device 100. The generation of the data package may be triggered by a user of the peripheral device 100, the peripheral device 100 itself (i.e., automatically), by the client device 104, and/or by the network device 102. As just one example, a processor of the peripheral device 100 and/or the client device 104 may detect an error with the peripheral device 100 and, in response, send a data package containing performance/log data to the network device 102. In some embodiments, the data package may be compiled for other reasons and/or may contain additional or alternative data, such as proprietary data, diagnostic data, sensitive data, and the like. In embodiments in which the data package was triggered by a device other than the peripheral device 100, the triggering device 100 (e.g., the client device 104, network device 102, etc.) may send a command to the peripheral device 100 that causes the peripheral device 100 to generate the data package.

The data package may be encrypted, for example, using the server public key. In some embodiments, the data package may be digitally signed, such as using the device private key, at operation 1010. In some embodiments, the data package may be signed prior to being encrypted.

The signed and/or encrypted data package may be sent to the client device 104 at operation 1015. The client device 104 may send the signed and/or encrypted data package to the network device 102 at operation 1020. The network device 102 may validate the signature of the data package at operation 1025, such as using the device public key. At operation 1030, the network device 102 may decrypt the data package, such as by using the server private key. The network device may then access the data within the data package for storage, analysis, processing, and/or other action. In embodiments in which the data package is signed prior to being encrypted, the data package may be decrypted first, followed by validating the signature.

Figure 11:
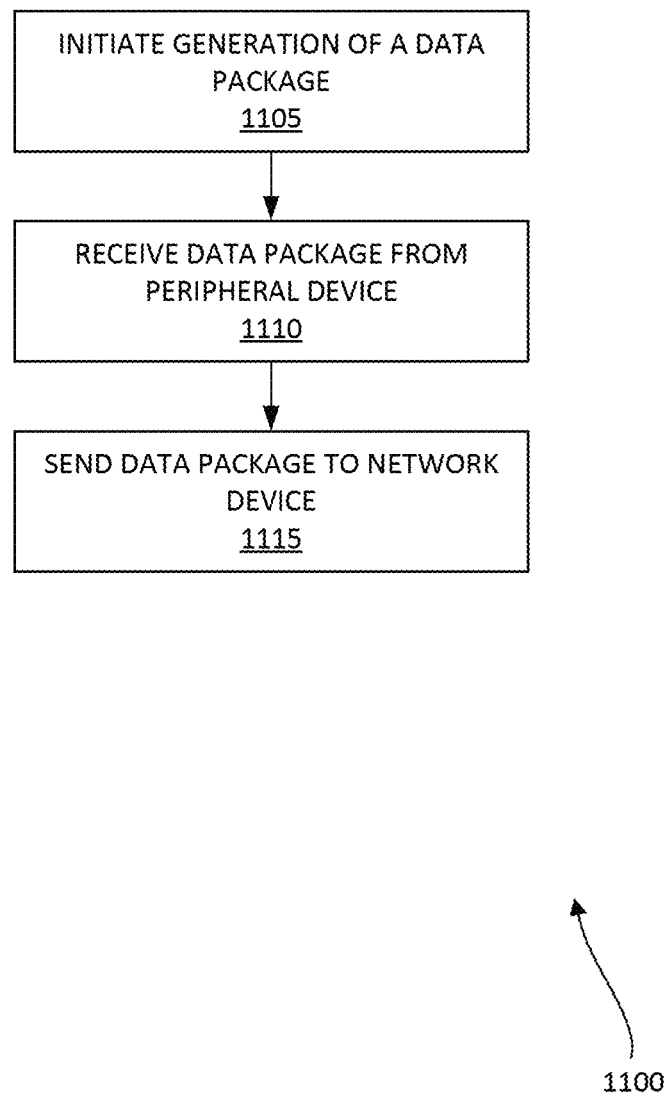
FIG. 11 is a flowchart of a process for securely sending data using a client device according to embodiments of the present invention.

FIG. 11 is a flowchart of a process 1100 for securely sending data. Process 1100 may describe further details of processes 1000, 1200, and 1300 described herein. Process 1100 may be performed, for example, by a client device 104 that serves as a communication intermediary between the peripheral device 100 and the network device 102. Process 1100 may include and/or be performed after a trust relationship has been established between the peripheral device 100 and the network device 102, such as via a process such as described in relation to FIGS. 2-5. Once the trust relationship has been established, proprietary data, sensitive data, performance data, and/or other data may be securely exchanged between the peripheral device 100 and the network device 102. For example, a data package may be assembled by the peripheral device 100 that includes proprietary data, sensitive data, performance data, and/or other data. In some embodiments, the client device 104 may initiate the generation of the data package at operation 1105. As just one example, the client device 104 may detect an error with the peripheral device 100 and, in response, alert the peripheral device 100 to assemble a data package containing performance/log data.

In some embodiments, the data package may be digitally signed and/or encrypted by the peripheral device 100, which may provide an indication of the source of the data package and/or prevent intermediate and/or intercepting parties from accessing the data stored within the data package. Once the data package has been assembled (whether initiated by the client device 104, the peripheral device 100, or other device), the data package may be sent to and received by the client device 104 at operation 1110. At operation 1115, the client device 104 may send the data package to the network device 102, which may subsequently access the data within the data package for storage, analysis, processing, and/or other action.

Figure 12:
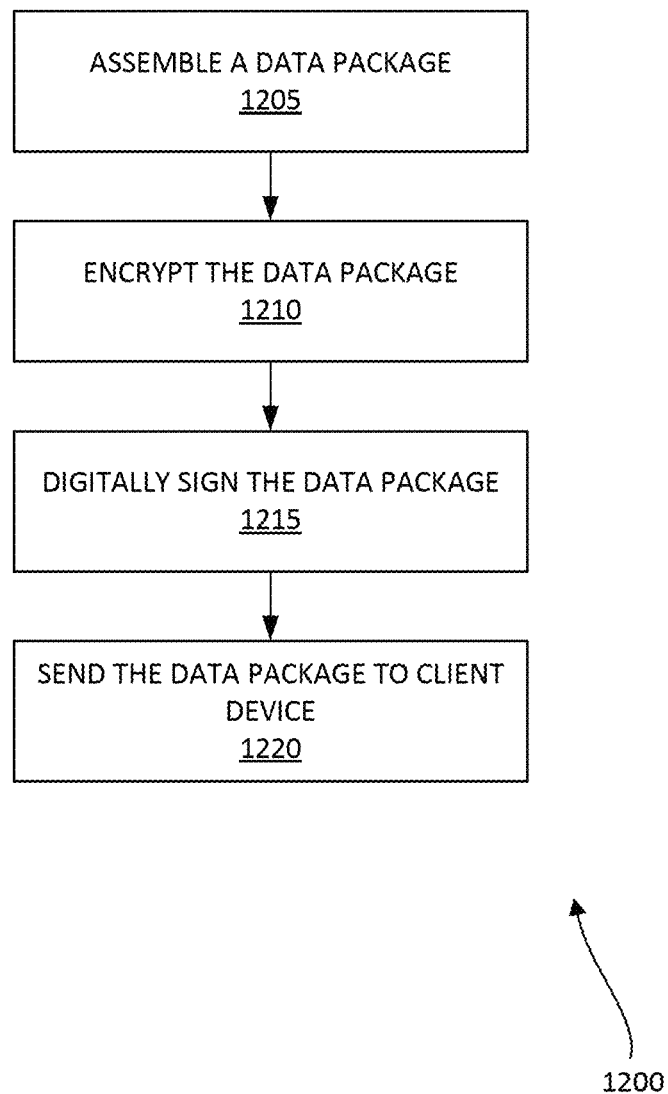
FIG. 12 is a flowchart of a process for securely sending data using a peripheral device according to embodiments of the present invention.

FIG. 12 is a flowchart of a process 1200 for securely sending data. Process 1200 may describe further details of processes 1000, 1100, and 1300 described herein. Process 1200 may be performed, for example, by a peripheral device 100 that uses a client device 104 as a communication intermediary with the network device 102. Process 1200 may include and/or be performed after a trust relationship has been established between the peripheral device 100 and the network device 102, such as via a process such as described in relation to FIGS. 2-5. Once the trust relationship has been established, proprietary data, sensitive data, performance data, and/or other data may be securely exchanged between the peripheral device 100 and the network device 102. For example, the peripheral device 100 may assemble a data package that includes proprietary data, sensitive data, performance data, and/or other data at operation 1205. In some embodiments, the assembly of the data package may be initiated by the peripheral device 100. As just one example, a processor of the peripheral device 100 may detect an error with the peripheral device 100 and, in response, assemble a data package containing performance/ log data for transmission to the network device 102. In some embodiments, the data package may be compiled for other reasons and/or may contain additional or alternative data, such as proprietary data, sensitive data, and the like. The triggering of the data package may be done by other devices, such as the network device 102, client device 104, and/or other device. At operation 1210, the peripheral device 100 may encrypt the data package, for example, using the server public key. In some embodiments, the data package may be digitally signed by the peripheral device 100 at operation 1215, such as using the device private key. At operation 1220, the peripheral device 100 may send the signed and/or encrypted data package to the client device 104 for subsequent transmission to the network device 102. The network device 102 may access the data within the data package for storage, analysis, processing, and/or other action.

Figure 13:
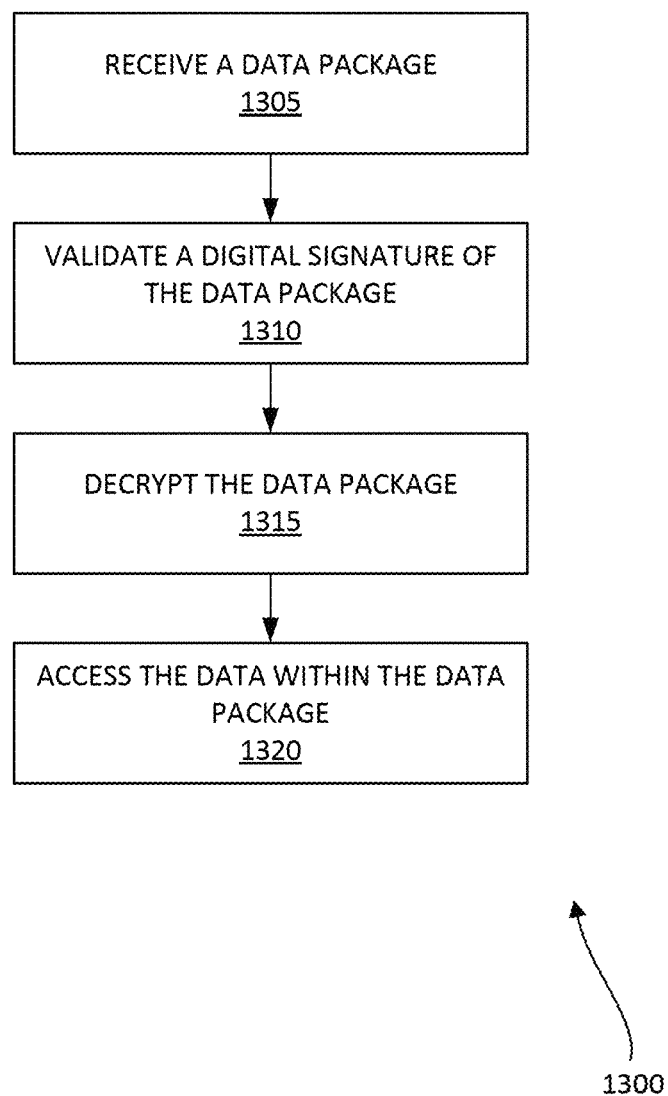
FIG. 13 is a flowchart of a process for securely sending data using a network device according to embodiments of the present invention.

FIG. 13 is a flowchart of a process 1300 for making a trusted request. Process 1300 may describe further details of processes 1000, 1100, and 1200 described herein. Process 1300 may be performed, for example, by a network device 102 that communicates with a peripheral device 100 via a client device 104 that serves as a communication intermediary between the peripheral device 100 and the network device 102. Process 1300 may include and/or be performed after a trust relationship has been established between the peripheral device 100 and the network device 102, such as via a process such as described in relation to FIGS. 2-5. Once the trust relationship has been established, proprietary data, sensitive data, performance data, and/or other data may be securely exchanged between the peripheral device 100 and the network device 102. For example, the peripheral device 100 may assemble a data package that includes proprietary data, sensitive data, performance data, and/or other data. The generation of the data package may be triggered by a user of the peripheral device 100, the peripheral device 100 itself (i.e., automatically), by the client device 104, and/or by the network device 102. As just one example, a processor of the peripheral device 100 and/or the client device 104 may detect an error with the peripheral device 100 and, in response, send a data package containing performance/log data to the network device 102. In some embodiments, the data package may be compiled for other reasons and/or may contain additional or alternative data, such as proprietary data, sensitive data, and the like. The data package may be encrypted, for example, using the server public key. In some embodiments, the data package may be digitally signed, such as using the device private key. The signed and/or encrypted data package may be sent to the client device 104 for subsequent transmission to the network device 102. The network device 102 may receive the data package from the client device 104 at operation 1305. The network device 102 may validate the digital signature of the data package at operation 1310. For example, the network device 102 may utilize the device public key to validate the signature. At operation 1315, the network device 102 may decrypt the data package, such as by using the server private key. The network device 102 may then access the data within the data package for storage, analysis, processing, and/or other action at operation 1320.

Figure 14:
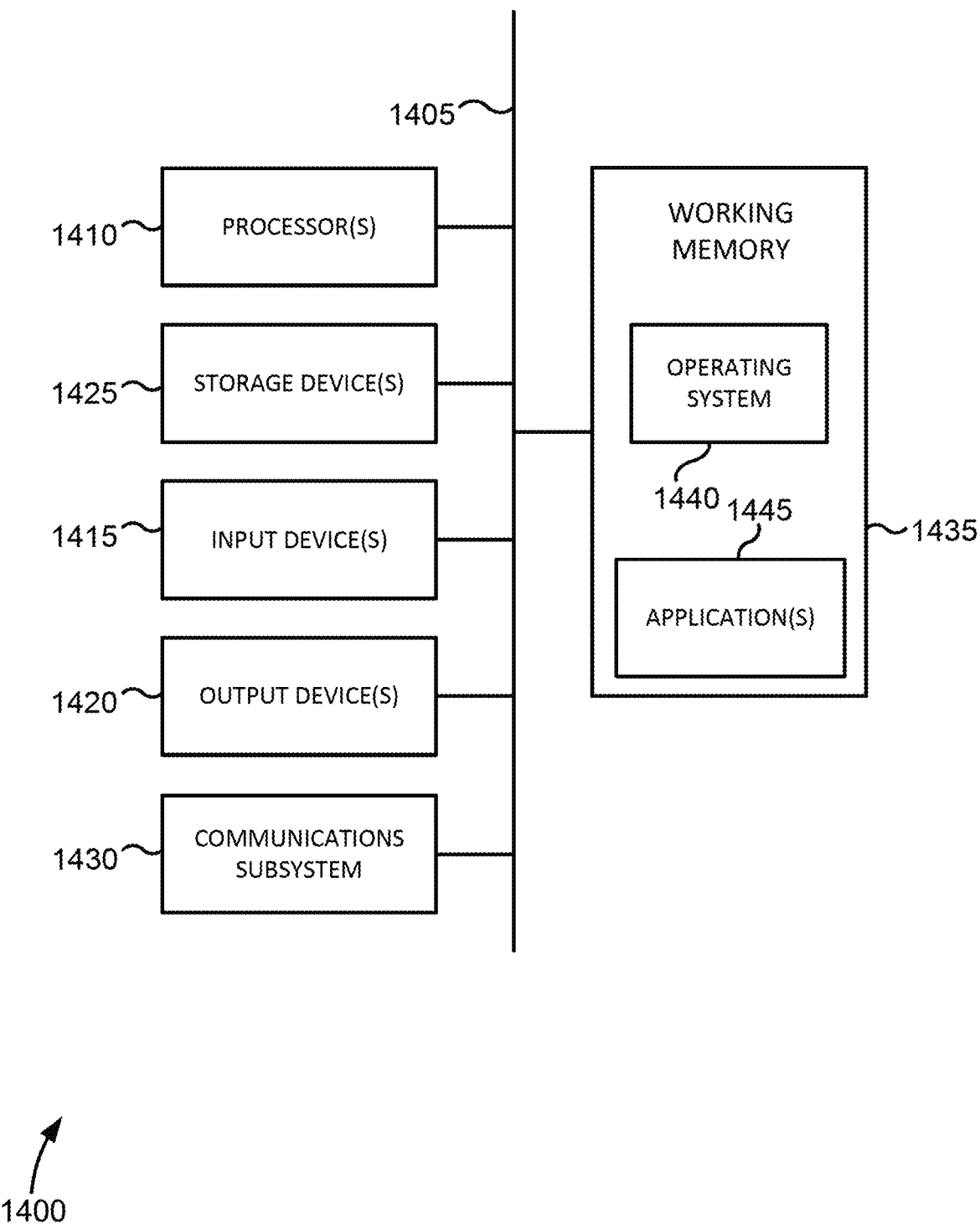
FIG. 14 is a block diagram of a computing device according to embodiments of the present invention.

A computer system as illustrated in FIG. 14 may be incorporated as part of the previously described computerized devices. For example, computer system 1400 can represent some of the components of computing devices, such as peripheral devices 100, network devices 102, client devices 104, identity provider 108, network 106, and/or other computing devices described herein. FIG. 14 provides a schematic illustration of one embodiment of a computer system 1400 that can perform the methods provided by various other embodiments, as described herein. FIG. 14 is meant only to provide a generalized illustration of various components, any or all of which may be utilized as appropriate. FIG. 14, therefore, broadly illustrates how individual system elements may be implemented in a relatively separated or relatively more integrated manner. The computer system 1400 is shown comprising hardware elements that can be electrically coupled via a bus 1405 (or may otherwise be in communication, as appropriate). The hardware elements may include a processing unit 1410, including without limitation one or more processors, such as one or more central processing units (CPUs), graphical processing units (GPUs), special-purpose processors (such as digital signal processing chips, graphics acceleration processors, and/or the like); one or more input devices 1415, which can include without limitation a keyboard, a touchscreen, receiver, a motion sensor, a camera, a smartcard reader, a contactless media reader, and/or the like; and one or more output devices 1420, which can include without limitation a display device, a speaker, a printer, a writing module, and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communication interface 1430, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 1430 may permit data to be exchanged with a network (such as the network described below, to name one example), other computer systems, and/or any other devices described herein. In many embodiments, the computer system 1400 will further comprise a non-transitory working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1410, applications 1445, etc.) Further, connection to other computing devices such as network input/output devices may be employed.

Some embodiments may employ a computer system (such as the computer system 1400) to perform methods in accordance with the disclosure. For example, some or all of the procedures of the described methods may be performed by the computer system 1400 in response to processing unit 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processing unit 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processing unit 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire, and fiber optics, including the wires that comprise the bus 1405, as well as the various components of the communication interface 1430 (and/or the media by which the communication interface 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1430 (and/or components thereof) generally will receive the signals, and the bus 1405 then might carry the signals (and/or the data, instructions, etc. carried by the signals) to the working memory 1435, from which the processor(s) 1410 retrieves and executes the instructions. The instructions received by the working memory 1435 may optionally be stored on a non-transitory storage device 1425 either before or after execution by the processing unit 1410.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMS, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of authorizing a computer mouse to perform a particular action, comprising:
   receiving, by a network device, a request associated with a particular action to be performed by the computer mouse, wherein the request is digitally signed using a private device key of the computer mouse;
   validating, by the network device, the digitally signed request using a public device key previously provided by the computer mouse;
   generating a response to the request, the response indicating whether the computer mouse is authorized to perform the particular action associated with the request; and
   sending the response to a client device associated with the computer mouse.

2. The method of authorizing the computer mouse to perform a particular action of claim 1, further comprising:
   prior to receiving the request, receiving, by the network device, the public device key and an identity token from the client device, wherein the public device key is generated by the computer mouse associated with the client device;
   associating, by the network device, the public device key with a particular user; and
   sending, by the network device, a server public key to the client device.

3. The method of authorizing the computer mouse to perform a particular action of claim 1, wherein:
   the particular action comprises an action selected from the group consisting of logging into a software application, unlocking a software-locked feature of the computer mouse, and performing the software-locked feature of the computer mouse.

4. The method of authorizing the computer mouse to perform a particular action of claim 1, wherein:
   the request is received from a remote device.

5. The method of authorizing the computer mouse to perform a particular action of claim 1, wherein:
   the request is received from the client device.

6. The method of authorizing the computer mouse to perform a particular action of claim 1, wherein:
   the public device key received from the computer mouse is encrypted using a public key of the network device; and
   the method comprises decrypting, by the network device, the public device key using a private key of the network device.

7. The method of authorizing the computer mouse to perform a particular action of claim 1, wherein:
   the request is encrypted using a public key of the network device; and
   the method comprises decrypting, by the network device, the request using a private key of the network device.

8. A method of securely receiving data from a computer mouse, comprising:
   receiving, by a network device, a public device key and an identity token from a client device associated with the computer mouse, wherein the public device key is generated by the computer mouse associated with the client device;
   associating, by the network device, the public device key with a particular user;
   sending, by the network device, a server public key to the client device;
   receiving, by the network device, a data package from the computer mouse, wherein:
      the data package has been digitally signed using a private key of the computer mouse; and
      the data package has been encrypted by the computer mouse using a public key of the network device;
   validating, by the network device, a digital signature of the data package using a public key of the computer mouse;
   decrypting, by the network device, the data packing using a private key of the network device; and
   accessing, by the network device, data from the data package.

9. The method of securely receiving data from the computer mouse of claim 8, further comprising:
   storing and analyzing the data from the data package.

10. The method of securely receiving data from computer mouse of claim 8, further comprising:
   sending, by the network device, a command to the computer mouse that causes the computer mouse to generate the data package.

11. The method of securely receiving data from the computer mouse of claim 8, wherein:
   the data from the data package comprises one or more types of data selected from the group consisting of proprietary data, diagnostic data, sensitive data, and analytical data.

12. The method of securely receiving data from the computer mouse of claim 11, wherein:
   the data package is relayed from the computer mouse to the network device using a client device associated with the computer mouse.

13. The method of securely receiving data from the computer mouse of claim 12, wherein:
   the client device comprises a device selected from the group consisting of a personal computer, a tablet computer, an e-reader, and a mobile phone.

14. A method of performing a particular action using a computer mouse, comprising:
   generating a device key pair comprising a private device key and a public device key;
   sending the public device key to a client device for subsequent transmission to a network device;

generating, by the computer mouse, a trusted request to perform a particular function;

digitally signing, by the computer mouse, the trusted request using the private device key of the computer mouse;

sending, by the computer mouse, the digitally signed trusted request to a client device for subsequent transmission to a network device;

receiving a response to the digitally signed trusted request from the client device, the response originating from the network device; and performing the particular function when the response comprises an approval.

15. The method of performing a particular action using the computer mouse of claim 14, further comprising:

encrypting the signed request using a public server key of the network device.

16. The method of performing a particular action using the computer mouse of claim 14, wherein:

the response is digitally signed by the network device using a private server key of the network device; and the method comprises validating a signature of the digitally signed response using a public server key of the network device.

17. The method of performing a particular action using the computer mouse of claim 14, wherein:

the response is encrypted by the network device using a public device key of the computer mouse; and the method comprises decrypting the digitally signed response using a private device key of the computer mouse.

18. The method of performing a particular action using the computer mouse of claim 14, wherein:

the particular function comprises one or both of unlocking a software or firmware-locked feature of the computer mouse and performing the software or firmware-locked feature of the computer mouse.

\* \* \* \* \*